US006827242B2

(12) United States Patent
Semenenko

(10) Patent No.: US 6,827,242 B2
(45) Date of Patent: Dec. 7, 2004

(54) THROUGH-FILL CLOSURE FOR A RECEPTACLE

(76) Inventor: Ivan Semenenko, Wolford Lodge, Great Wolford Road, Moreton-in-Marsh, Gloucestershire, GL56 0PE (GB)

( * ) Notice: Subject to any disclaimer, the term of this patent is extended or adjusted under 35 U.S.C. 154(b) by 173 days.

(21) Appl. No.: 10/200,196

(22) Filed: Jul. 23, 2002

(65) Prior Publication Data

US 2003/0075572 A1 Apr. 24, 2003

(30) Foreign Application Priority Data

Jul. 25, 2001 (GB) .............................................. 0118122
Jul. 28, 2001 (GB) .............................................. 0118427

(51) Int. Cl.[7] .............................................. B65D 47/00
(52) U.S. Cl. ................... 222/559; 222/185.1; 222/199; 222/501; 222/509; 222/542; 277/634
(58) Field of Search ............................... 222/199–200, 222/559, 542, 501, 504, 507, 509, 518, 185.1, 181.1; 141/382, 386, 312, 346, 369–370, 372, 301, 65, 67; 277/634, 636

(56) References Cited

U.S. PATENT DOCUMENTS

| | | | | |
|---|---|---|---|---|
| 4,470,524 A | * | 9/1984 | Semenenko | 222/196 |
| 5,743,439 A | * | 4/1998 | Semenenko | 222/185.1 |
| 6,123,233 A | * | 9/2000 | Nussbaumer | 222/200 |
| 6,296,152 B1 | * | 10/2001 | Semenenko | 222/199 |
| 6,305,443 B1 | * | 10/2001 | Semenenko | 141/346 |
| 6,595,735 B1 | * | 7/2003 | Lee | 414/292 |
| 6,623,013 B1 | * | 9/2003 | Lee | 277/628 |
| 6,658,824 B2 | * | 12/2003 | Nussbaumer et al. | 53/505 |

FOREIGN PATENT DOCUMENTS

| | | | |
|---|---|---|---|
| EP | 0 380 255 A1 | 8/1990 | |
| EP | 0 550 199 A1 | 7/1993 | |
| EP | 1 129 968 A1 | 9/2001 | |
| GB | 2 262 514 A | 6/1993 | |
| GB | 2 262 515 A | 6/1993 | |
| GB | WO-0010993 | * 3/2000 | ........... B65D/90/62 |
| WO | 90/08724 | 8/1990 | |
| WO | WO-9708080 | * 3/1997 | ........... B65D/90/62 |
| WO | WO 00/10893 | 3/2000 | |
| WO | WO 00/34163 | 6/2000 | |

* cited by examiner

Primary Examiner—Frederick Nicolas
(74) Attorney, Agent, or Firm—Young & Thompson

(57) ABSTRACT

A through-flow closure for a receptacle of flowable material, the closure includes a body part having a charging aperture and a closure operating member for opening the closure device of a container. There is an annular gap between the edge of the aperture and the closure operating device. A stretchable annular sealing member attached to the body part. The sealing member seals the gap between the body part and the closure operating member when the receptacle and container are separated and forms a seal between the body part and the container when the receptacle and the container are moved together and prior to the closure operating member opening the closure device of the container.

8 Claims, 4 Drawing Sheets

US 6,827,242 B2

THROUGH-FILL CLOSURE FOR A RECEPTACLE

INTRODUCTION

This invention relates to a through-fill closure for a receptacle of flowable material, such as an intermediate bulk container (I.B.C.).

Containers such as bulk storage vessels, silos, hoppers and the like are often used for handling and storing flowable material, such as powder or like particulate material, though the material could be a liquid, slurry or similar. Such a container commonly includes an outlet valve comprising a valve body and an internal closure device. The closure device can be raised or lowered to open and close the outlet valve. The flowable material is often required to be transferred from the container through the valve outlet thereof to a receptacle, such as an I.B.C., for further handling. Where the material can contaminate the surrounding environment as well as the container and receptacles themselves, complicated, and thus expensive, equipment has to be utilised for removing a closure or lid of a charging aperture of the receptacle.

It is known from GB-A-2262515 to provide a container of the kind herein defined with an internal closure device which can be raised and lowered by a pneumatic actuator to open and close the valve outlet. There is a suction cup below the closure device for removing a loose lid of a receptacle into which material from the container is to flow once the container and receptacle have been brought into sealing contact with one another. The use of a suction cup suffers from the drawback that it is prone to leakage with the result that the lid falls back onto the receptacle.

SUMMARY OF THE INVENTION

According to the present invention there is provided a through-fill closure for a receptacle of flowable material, the closure comprising a body part having a charging aperture, a closure operating member for opening the closure device of a container of the kind herein defined, there being an annular or substantially annular gap between the edge of the aperture and the closure operating device, and a stretchable annular sealing member attached to the body part, the sealing member sealing the gap between the body part and the closure operating member when the receptacle and container are separated and forming a seal between the body part and the container when the receptacle and the container are moved together and prior to the closure operating member opening the closure device of the container.

The invention will now be more particularly described, by way of example, with reference to the accompanying drawings.

DESCRIPTION OF THE PREFERRED EMBODIMENT

Figure 1:
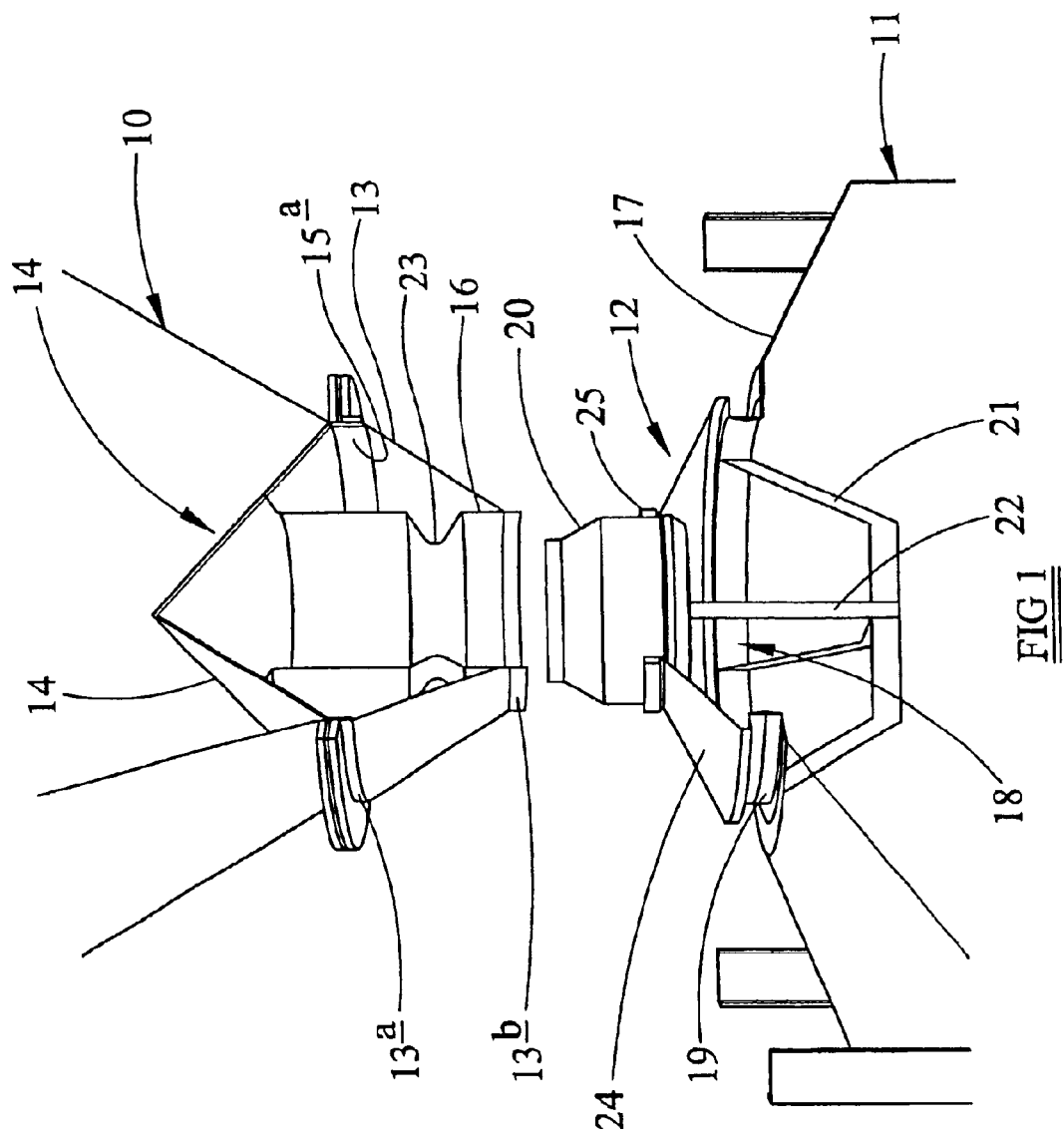
FIG. 1 is a perspective, partially cut away, fragmentary view of a container and a receptacle fitted with one embodiment of a through-fill closure according to the present invention, with the container and receptacle separated.
Figure 2:
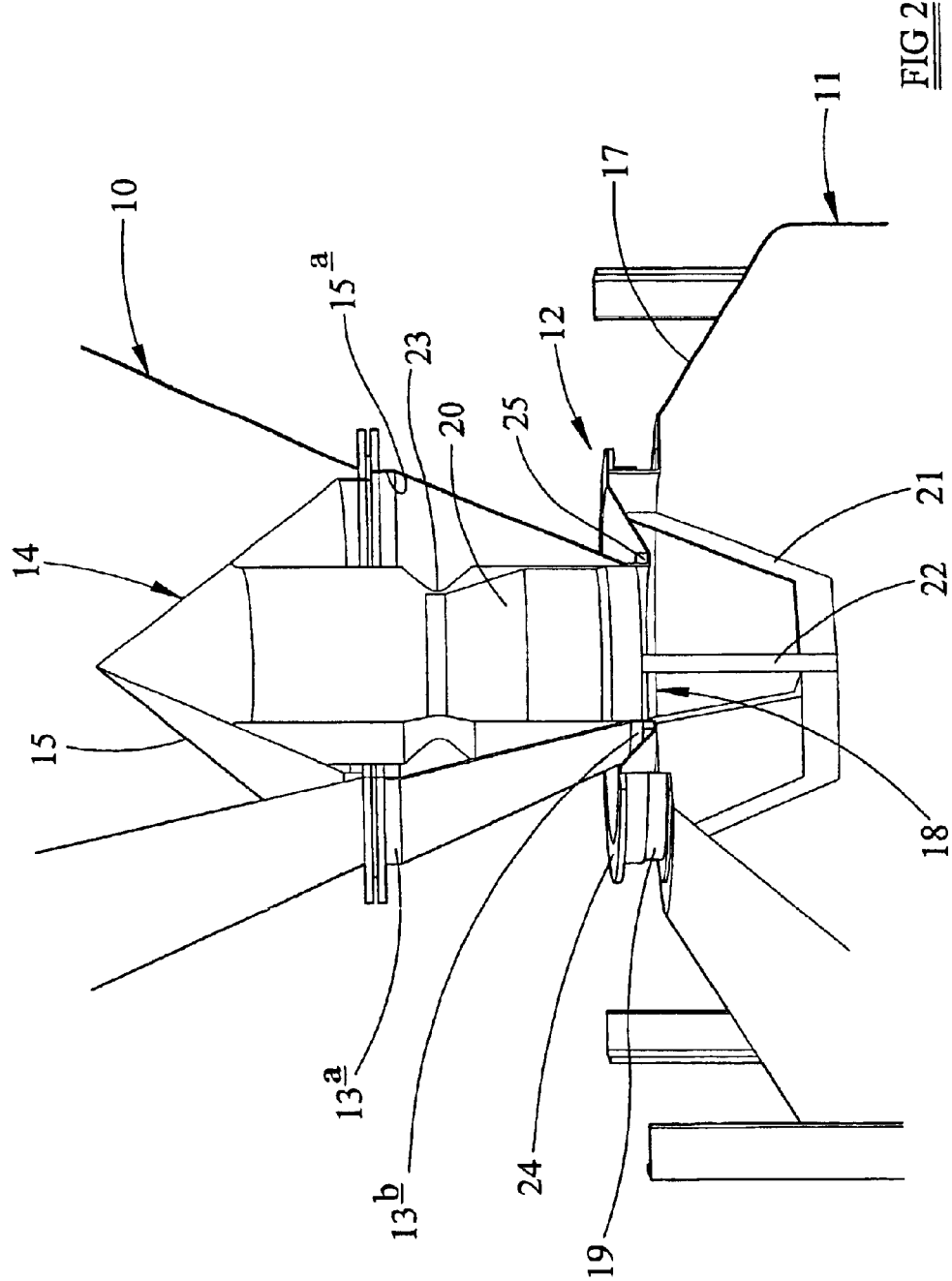
FIG. 2 is a view similar to FIG. 1 but with the container and receptacle together and prior to opening of the closure device of the container.

Referring now to the drawings, there is shown therein a container 10, such as a silo or hopper, for storing and distributing flowable material to a receptacle 11, such as an I.B.C., via a through-fill closure 12.

The container 10 includes an outlet valve comprising a valve body 13 and an internal closure device 14. The valve body 13 is generally frusto-conical (or of truncated pyramidical shape) although it does have a short cylindrical portion 13a at its upper end and a short cylindrical portion 13b at its lower end. The valve body 13 is preferably secured to the container body, such as by bolts, with a lip seal (not shown) therebetween, although it may be an integral part of the container.

The closure device 14 has an upper conical (or pyramidical) portion 15 with a short outer cylindrical flange 15a at its lower end and an inner waisted generally cylindrical portion 16 secured to and depending from the upper conical portion 15.

The through-fill closure 12 comprises a body part 17 which forms the lid of the receptacle 11. The body part 17 may be attached to the receptacle, such as by bolts, or may be an integral part thereof. The body part 17 has a charging aperture 18 for receiving flowable material from the container 10. The aperture 18 is defined by a support ring 19 of C-shaped cross section.

The through-fill closure 12 also comprises a closure operating member 20 in the form of a probe or plug 20. The plug 20 is secured to the flange 19 by five equiangularly spaced, radially extending, ribs 21 and an upstanding post 22 connected between the plug 20 and the inner ends of the ribs 21. An annular gap is provided between the plug 20 and the support ring 19. The plug 20 projects above the body part 17 of the through-fill closure 12 and is shaped to fit within a recess defined by the cylindrical portion 16 of the closure device 14 and engage with the waisted portion 23 thereof.

The through-fill closure 12 also comprises a flexible, stretchable, annular seal 24 of elastomeric material. The outer peripheral edge of the seal 24 is secured to the upper edge of the support ring 19 and the inner peripheral edge of the seal 24 has a thickened portion 25 which is a tight slidable fit on the outer surface of the plug 20. As shown in FIG. 1, the thickened portion 25 lies flat against the surface of the plug 20.

Figure 3:
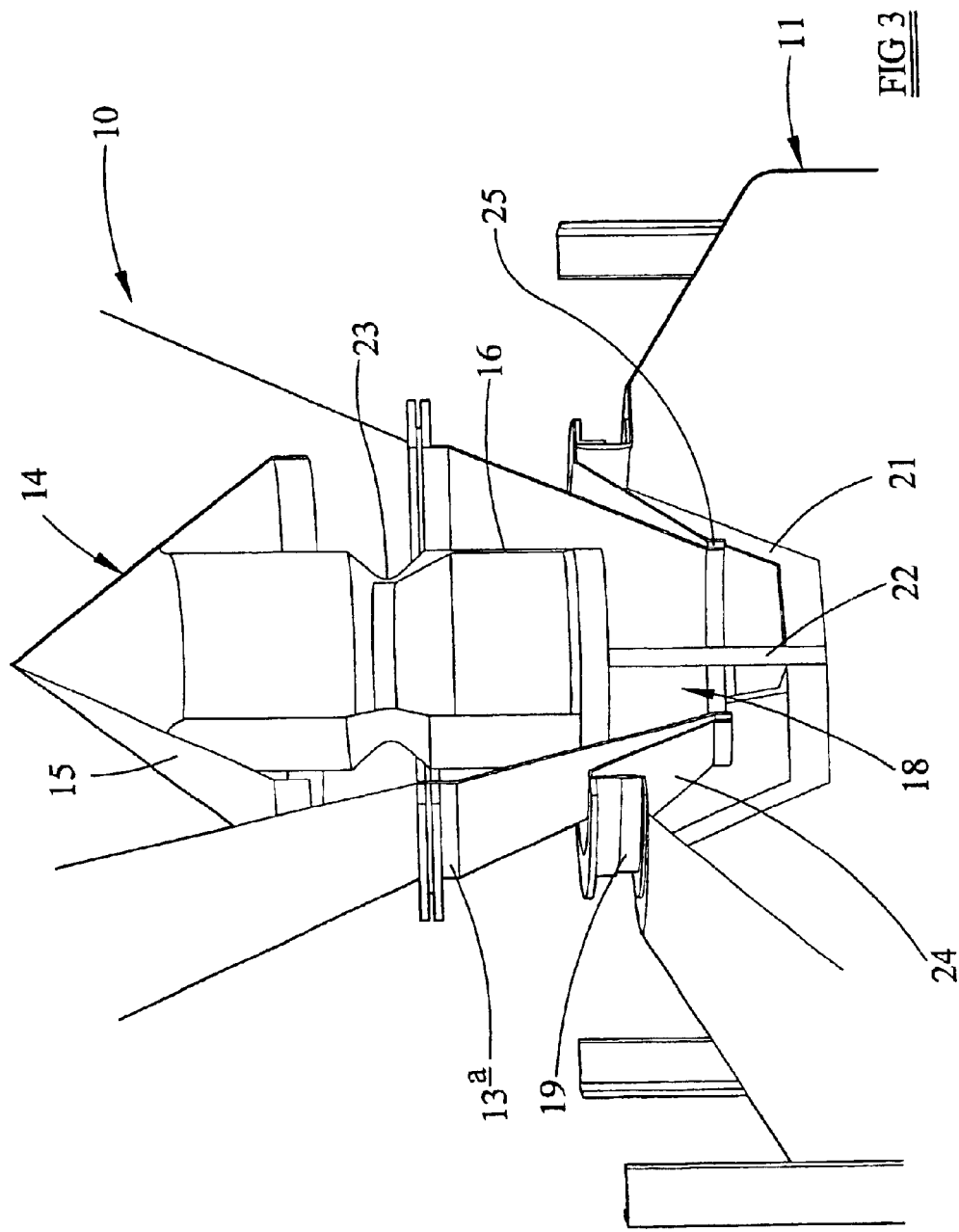
FIG. 3 is a view similar to FIG. 2 but with the closure device of the container open.
Figure 4:
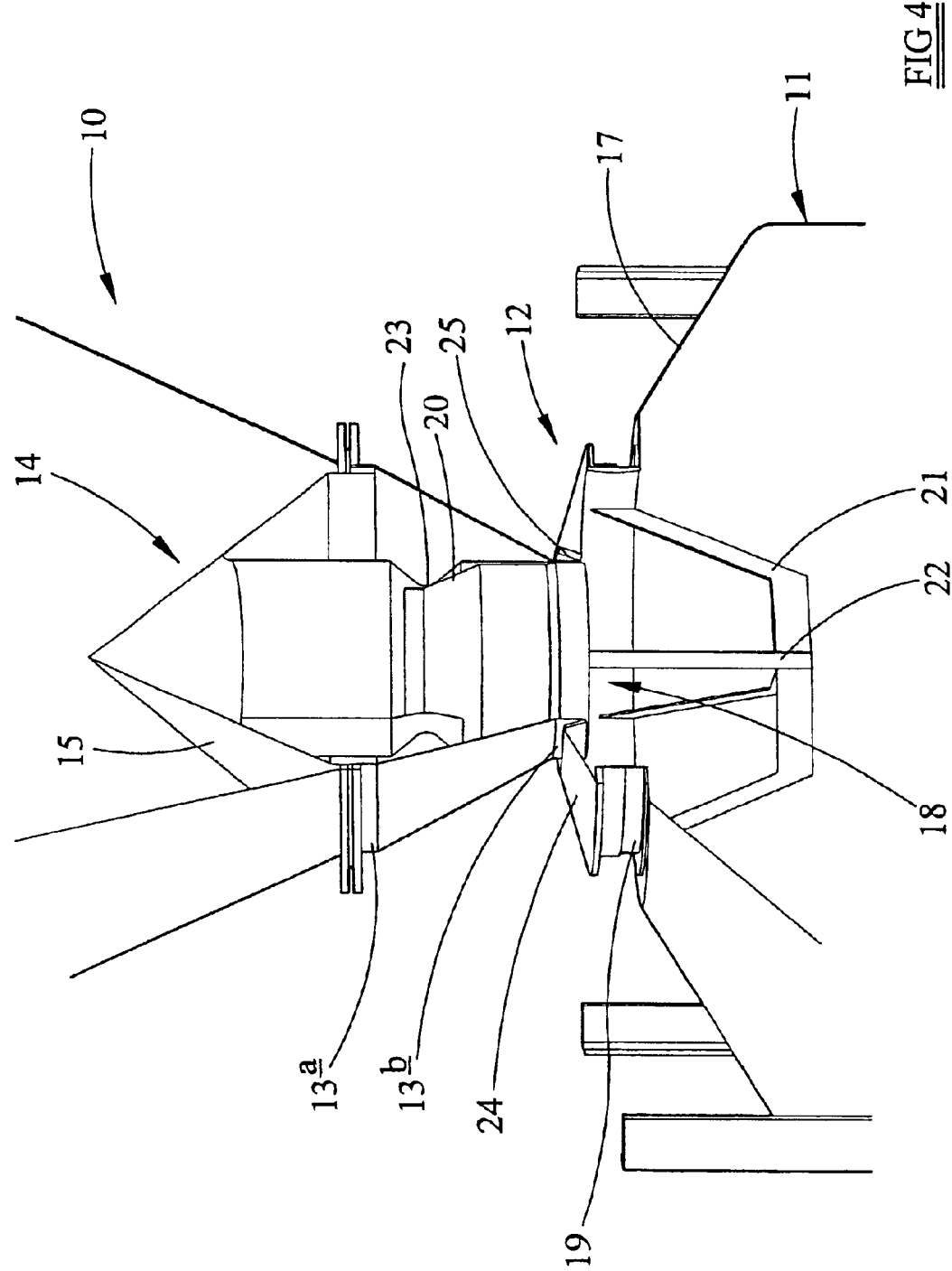
FIG. 4 is a view similar to the previous figures but showing the through-fill closure just prior to separation of the container and receptacle.

In order to discharge flowable material from the container 10 into the receptacle 11, the receptacle 11 is raised relative to the container 10. Initially the inner thickened portion 25 of the seal 24 makes contact with the lower edge of the valve body 13. This generates a seal between the container 10 and the receptacle 11 and prevents the inside of the container 10 and the inside of the receptacle 11 from being exposed to the environment. Further upward movement of the receptacle 11 relative to the container 10 brings the plug 20 into engagement with the waisted portion 23 of the closure device 14 and yet further upward movement of the receptacle 11 causes the seal to stretch into an inverted cone shape and the thickened portion 25 of the seal 24 to flip over so as to lie flat against the cylindrical portion 13b of the valve body 13, as shown in FIG. 3. This further upward movement of the receptacle 11 also causes the plug 20 to raise the closure device 14 to allow material to flow from the container 10 into the receptacle 11. Subsequent lowering of the receptacle 11 relative to the container 10 initially closes the closure device 14 and subsequently pulls the seal 24 away from the lower end of the valve body 13 and into snap-fit contact with the outer surface of the plug 20. As a result of this, it will be appreciated that there is no exposure of material to the environment both at the time of engagement and at the time of disengagement of the container and the receptacle.

The through-flow closure 12 provides a simple and cost effective device for ensuring that the inside of the container 10 and the inside of the receptacle 11 are never exposed to the environment. After the receptacle 11, has been filled, the plug 20 and the top surface of the seal 24 are clean and product free. Also, the lower surface of the conical portion 15 of the closure device 14 and the internal recess of the cylindrical portion 16 of the closure device are clean.

The valve body 13 may be flexibly connected to the container 10 in order to lower the valve body 13 onto the receptacle 11 as an alternative to raising the receptacle 11 into engagement with a container 10.

If the container 10 is large and/or the flowable material contained therein is very cohesive, the container 10 could be fitted with an auxiliary vibratory closure device, such as is described in GB-A-2348636, above the closure device 14. Alternatively, means could be provided for causing up and down vibratory movement of the receptacle 11 or valve body 13 and thereby of the closure device 14 during discharge of material.

Although the container as described above is fixed, it could be movable and, for example, in the form of an I.B.C. The receptacle can be movable or fixed. Thus, the container and receptacle could, for example, both be in the form of I.B.C.=s.

The embodiments described above are given by way of example only and various modifications will be apparent to persons skilled in the art without departing from the scope of the invention as defined in the appended claims.

What I claim is:

1. A through-fill closure for a receptacle of flowable material, the closure comprising a body part having a charging aperture; a closure operating member for opening a closure device of a container; said closure operating member being connected to the body part by a plurality of rigid spaced apart connecting elements; an annular or substantially annular gap between the edge of the aperture and the closure operating device; and a stretchable annular sealing member attached to the body part; the sealing member sealing the gap between the body part and the closure operating member when the receptacle and container are separated, and forming a seal between the body part and the container when the receptacle and the container are moved together and prior to the closure operating member opening the closure device of the container.

2. A closure as claimed in claim 1, wherein the closure operating member projects above the body part so as to extend into the container and engage with the closure device to raise the latter relative to the container, as the receptacle and container are moved together.

3. A through-fill closure as claimed in claim 1, wherein the sealing member has a thickened inner edge portion which sealingly and slidably engages the closure operating member when the receptacle and container are separated.

4. A through-fill closure as claimed in claim 1, in combination with a receptacle of flowable material, the closure closing the top of the receptacle when the receptacle and container are separated.

5. The combination of claim 4 in combination also with the container having an outlet valve comprising a valve body and the closure device which can be raised or lowered to open and close the outlet valve.

6. The combination of claim 5, wherein the upper surface of the closure device is conical or pyramidical.

7. The combination of claim 5, wherein the closure device has a recess in its lower surface for receiving part of the closure operating device.

8. The combination of claim 5, wherein the receptacle is an intermediate bulk container.

* * * * *